(12) United States Patent
Minichshofer

(10) Patent No.: US 7,518,545 B2
(45) Date of Patent: Apr. 14, 2009

(54) DRIVER ASSISTANCE SYSTEM

(75) Inventor: Jürgen Minichshofer, Linz (AT)

(73) Assignee: Infineon Technologies AG, Munich (DE)

( * ) Notice: Subject to any disclaimer, the term of this patent is extended or adjusted under 35 U.S.C. 154(b) by 136 days.

(21) Appl. No.: 11/586,852

(22) Filed: Oct. 26, 2006

(65) Prior Publication Data

US 2008/0169965 A1    Jul. 17, 2008

(51) Int. Cl.
*G01S 13/00* (2006.01)
*G06F 7/00* (2006.01)
*G06F 17/00* (2006.01)

(52) U.S. Cl. ............................. 342/70; 342/59; 701/36; 701/93

(58) Field of Classification Search .................. 342/29, 342/59, 70–72, 82–88; 701/93, 36, 45, 70, 701/79
See application file for complete search history.

(56) References Cited

U.S. PATENT DOCUMENTS

| 5,670,962 A * | 9/1997 | Henderson et al. ............ 342/70 |
| 6,907,329 B2 * | 6/2005 | Junger et al. .................. 701/36 |
| 2005/0055150 A1 * | 3/2005 | Uhler et al. .................... 701/93 |

* cited by examiner

*Primary Examiner*—Thomas H Tarcza
*Assistant Examiner*—Peter M Bythrow
(74) *Attorney, Agent, or Firm*—Eschweiler & Associates, LLC

(57) ABSTRACT

Driver assistance system of a land or water vehicle that encompasses a long-range radar apparatus for the detection of distant objects and at least one short-range detection apparatus for the detection of objects in the vehicle's close proximity. The system further includes an operation control apparatus for control of operation at least of the long-range radar apparatus depending on a motion state of the land or water vehicle. The operation control apparatus is configured to deactivate the long-range radar apparatus at least at standstill of the land or water vehicle or switch it to an essentially powerless standby mode, while keeping the short-range detection apparatus activated.

33 Claims, 2 Drawing Sheets

DRIVER ASSISTANCE SYSTEM

FIELD OF THE INVENTION

The invention refers to a driver assistance system of a land or water vehicle.

BACKGROUND OF THE INVENTION

A driver assistance system comprises a long-range radar apparatus for the detection of remote objects, especially vehicles travelling ahead, and at least one short-range detection apparatus for the detection of objects in the vehicle's closer proximity. Such assistance systems are now offered by several manufacturers and their scope of performance is being constantly extended.

Current systems detect when a driver approaches a vehicle travelling ahead, determine its speed and, by means of suitable engine, automatic gearbox and/or brake system interventions, maintain a required distance from it with regard to safety aspects. By means of appropriate engine interventions, advanced versions already realize re-acceleration of the vehicle as soon as there is no longer any vehicle travelling ahead in the detection apparatus' range of measurement. In the case of certain commercially available systems, the driver has a possibility of pre-selecting the desired cruising speed and a desired safety distance from vehicles travelling ahead.

To avoid relieving the driver of his responsibility, the chosen amount of deceleration by the aforementioned interventions, and also the chosen amount of acceleration in the event or re-acceleration, are clearly below the value attainable during manual operation of the vehicle, and manual actuation has priority over the assistance system's control functions. The vehicle accelerates in the customary fashion when the accelerator is operated. The pre-selected speed is set again when the driver takes his foot off the accelerator. The assistance system can be deactivated in total by touching the brake pedal or by means of a special operator control of the assistance system.

Although current knowledge of modern driver assistance systems' radar facilities does not hint at any acute health risks, with a view to the increase in electromagnetic pollution they cause and interference with observatories, in some countries there are public authority regulations governing the operating principles of such systems. This includes the requirement that the power radiated by a long-range radar in the current usual frequency band from 76-77 GHz must not exceed a certain value at vehicle standstill. This value lies clearly below the values that are necessary for optimum operation at higher speeds (up to 250 km/h) and current signal processing technologies.

According to the current state of the art, there are diverse approaches towards circumventing or solving this problem. To some extent, manufacturers abstain from delivering their systems to countries where relevant requirements apply. A further possible solution is to use pulsed radar systems in which the pulse pauses are increased when the vehicle is at standstill. The concomitant reduction in verification sensitivity is acceptable at standstill or low speeds but, technically, this system is relatively complex. A further possible solution consists of using a variable-power oscillator or intermediate amplifier or power amplifier. However, this approach also involves considerable complexity and is therefore critical in terms of cost.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

In one embodiment, the invention provides for a driver assistance system. The system comprises a long-range radar apparatus for the detection of distant objects and at least one short-range detection apparatus for the detection of objects in the vehicle's close proximity. The system further comprises an operation control apparatus for control of operation of at least the long-range radar apparatus depending on a motion state of the land or water vehicle. The operation control apparatus is adapted to deactivate the long-range radar apparatus when the land or water vehicle is at standstill, or switches the long-range radar apparatus to a substantially emission-free standby mode and keeps the short-range detection apparatus activated.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Advantages and expediencies of the invention transpire from the following description referred to the figures. Of these.

DETAILED DESCRIPTION OF THE INVENTION

Figure 1:
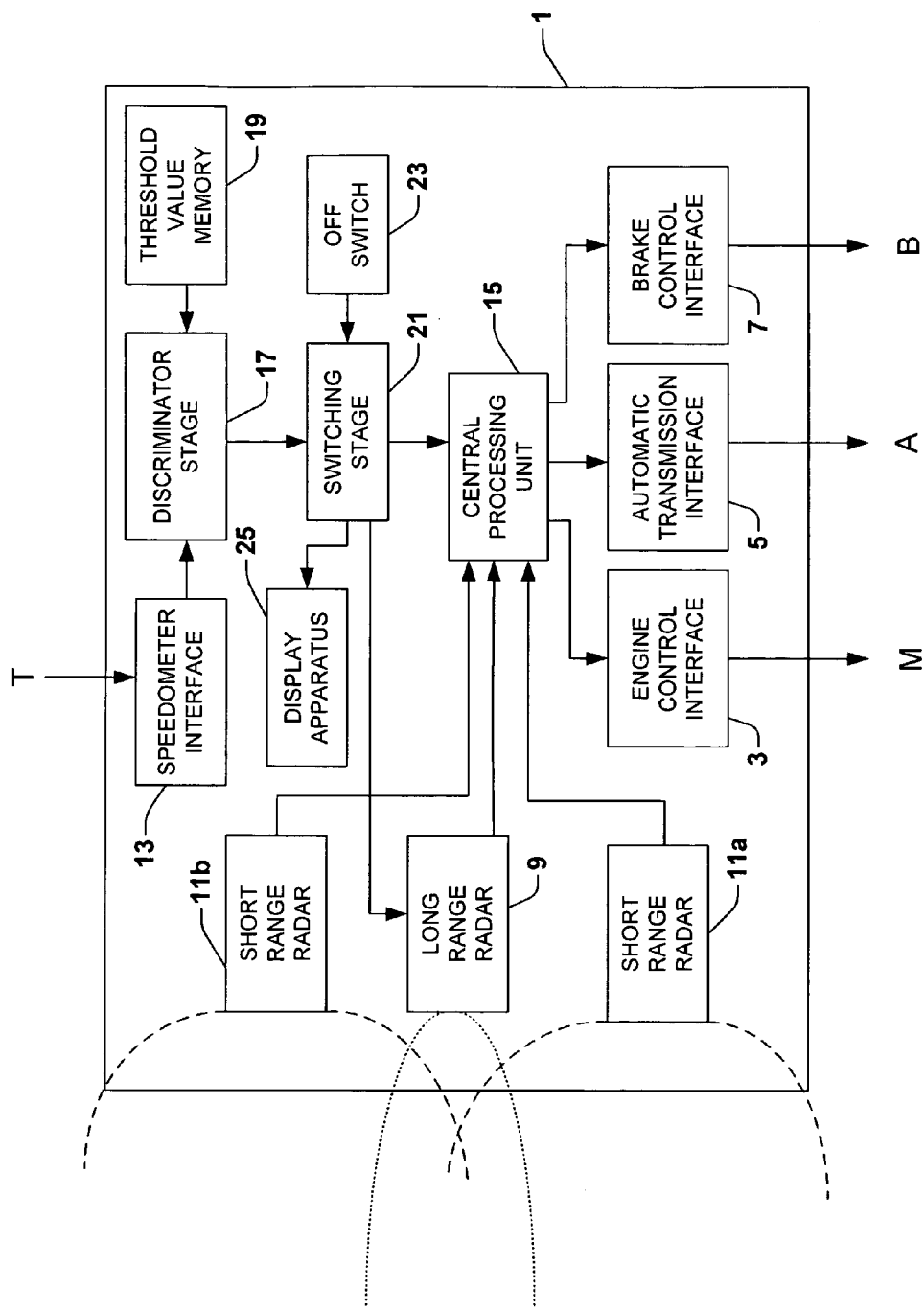
FIG. 1 is a block diagram illustrating a schematic of a first embodiment of the invention.

The invention provides for an improved driver assistance system that enables fulfilment of public authority requirements in terms of a lower power output at vehicle standstill without substantially increased design and cost complexity and without impairing the functioning of the equipment.

Thus, the invention provides for a driver assistance system. The system comprises a long-range radar apparatus for the detection of distant objects and at least one short-range detection apparatus for the detection of objects in the vehicle's close proximity. The system further comprises an operation control apparatus for control of operation of at least the long-range radar apparatus depending on a motion state of the land or water vehicle, wherein the operation control apparatus is adapted to deactivate the long-range radar apparatus at least at standstill of the land or water vehicle, or switches it to a substantially emission-free standby mode and keeps the short-range detection apparatus activated.

In one embodiment, the invention includes the ability to disable the power control mechanism of the long-range radar system. It furthermore includes an embodiment where instead completely deactivating this system component, deactivation occurs at least at vehicle standstill, in order to conform to existing or anticipated requirements. At the same time, in an alternative embodiment that can also be referred to as "sensor fusion", a short-range detection apparatus for the detection of objects in the vehicle's close proximity is kept active or is activated in these phases of operation to compensate for the disabled function of the long-range radar. It is noted that changeover of the long-range radar to a standby mode in which no essential output power is emitted, but in which the system component is immediately ready to respond if required, is held to be equivalent to complete deactivation in one embodiment.

In one embodiment, the invention relies on the fact that the long-range radar apparatus (commonly also referred to as LRR) detects distant objects with a radiation angle of only a few degrees, for example ±4° around the direction of travel, with a relatively high radiated power. However, this function of the LLR is not needed at all for the driver assistance function at a low speed or at vehicle standstill. In these driving states, a short-range radar (SRR), for example, with an operating range of a few meters to approximately 50 m, can control the assistance function to an adequate degree of precision and reliability.

In one embodiment, the long-range system is not reactivated until the vehicle starts off again or has exceeded a specific threshold speed above which the short-range detection unit's monitoring function no longer reliably suffices.

In a further embodiment of the invention the operation control apparatus is configured such that the long-range radar apparatus is deactivated once the vehicle drops below a first predetermine threshold speed or it switches to a standby mode and is reactivated, or switched back to normal operation from the standby mode, once a second predetermined threshold speed is exceeded. In this embodiment, the driver assistance system's contribution to electromagnetic pollution can be minimized due to the technical conditions and independently of the specific formulation of public authority requirements if the predetermined speeds are suitably defined. In particular, in one embodiment it is intended for the first predetermined threshold speed to be equal to the second predetermined threshold speed.

In a low-cost manner, the invention makes it possible in one embodiment for the long-range radar apparatus to be designed for exclusive continuous wave operation. Therefore, the version of the radar apparatus for all manner of pulsed operation and, in particular, for pulsed operation with controllable pulse pauses and the related design and component complexity becomes dispensable. Furthermore, it is planned as a simple version to design the long-range radar apparatus for operation with one single predetermined transmitting power value. This makes it possible to dispense with the provision of components for power control of the transmitter's microwave generator. This also has a cost-cutting effect.

As discussed further above, in a further embodiment the short-range detection apparatus features a second radar apparatus that has a substantially lower transmitting power in comparison with the long-range radar apparatus, or which works in a frequency band in which there are no restrictions, or restrictions that are substantially easier to fulfill, in relation to the power emitted at standstill. As an alternative to this or also in combination with it, however, it can be planned for the short-range detection apparatus to operate on an IR or ultrasound (US) basis or operate as a camera-based system.

In this embodiment, at vehicle standstill or below a threshold speed the driver assistance system may possibly not emit any microwave radiation at all, therefore behaving neutrally in terms of electromagnetic pollution. However, for ranges exceeding the IR or US range of a few meters, which can be realized without problems, the embodiment employing a (second) radar system may be technically more expedient in practice.

In a further embodiment of the invention, the changeover function of the operation control apparatus is capable of manual deactivation. Accordingly, the system can be adapted to differing legal regulations or public authority requirements in differing regions in which the vehicle is used and, optionally, it also possible to achieve power-optimized adaptation to difficult conditions of use.

In a further embodiment, it is planned for the long-range radar apparatus to control an engine, automatic gearbox and/or brake function or a warning display apparatus. Considering this embodiment, it is planned in one configuration of the invention to use an operating state display apparatus to indicate deactivation of the long-range radar apparatus and the resulting unavailability of its control or warning function. In this way, the driver will be informed without doubt about whether the complete sensor capabilities of the system is available in a certain driving condition and whether he may have to expect restrictions of the assistance function.

In an alternative embodiment, a control system changeover unit switches over the control function of the long-range radar apparatus in its deactivated states or in the standby mode solely to the short-range detection apparatus. The configuration presupposes the presence of an adequately powerful short-range detection apparatus that is able to fully substitute the inactive long-range radar apparatus at low vehicle speeds to enable the necessary control interventions.

In one embodiment, the short-range detection apparatus is configured as a parking assistance system, wherein the operation control apparatus is configured to automatically activate it at standstill of the land or water vehicle or when the vehicle is below the first predetermined speed. Such parking assistants are already available at low cost today and are installed in series vehicles belonging to practically all classes, and so their integration in the assistance system according to the invention is fundamentally possible without problems and at low cost.

Besides an increase in the range, in one embodiment of the invention, changeover of at least one display function of a conventional parking assistance system is provided in the event that it is used with the driver assistance system according to the invention. In the new function of the parking assistant, the typical audible signals of a parking assistant or another display mode that is helpful during a parking manoeuvre would rather irritate the driver and will therefore be expediently modified in one embodiment.

FIG. 1 shows components, in connection with one embodiment of the invention, of an adaptive closed-loop speed control apparatus 1 which, via an engine control interface 3, an automatic transmission interface 5 and a brake control interface 7, influences vehicle functions in the sense of adjustment of vehicle speed with respect to the presence of vehicles travelling ahead and in relation to the speed thereof. These basic functions are presumed to be known and are therefore not described in further detail here.

As sensors, the speed control apparatus 1 features a long-range radar (LRR) 9 and short-range radars (SRR) 11a, 11b on the left and right, each with associated (not depicted separately) evaluation electronics, and a speedometer interface 13. The inner structure and functions of these components are also known and are therefore not described in any further detail. It is merely mentioned that the long-range radar 9 is configured to detect objects located far ahead of the vehicle and for their detection as vehicles or other objects travelling ahead, while the short-range radars 11a, 11b obliquely scan the areas on the left and right in front of the vehicle with a shorter range, in particular to provide assistance functions of the system when negotiating bends/turning off and pulling out/passing.

Just like the radars 9, 11a and 11b, the speedometer interface 13 is linked at the input end to a central processing unit 15 of the speed control apparatus 1, which is linked at the output end to the interfaces 3 to 7 for influencing the driving conditions. The functionality and the structure of the central processing unit are also not explained in further detail here, however, the CPU may be implemented in hardware, software, or a combination of both.

Besides the central processing unit 15, the speedometer is linked, via the speedometer interface 13, to a discriminator stage 17, which is linked via a further input to a threshold value memory 19. In this, a predetermined speed is stored and, in the event that the actual speed falls below the stored value, the long-range radar 9 is to be deactivated and on the other hand, if the stored value would be exceeded (after the actual speed falling below it), the long-range radar 9 is to be returned to operation again. In the discriminator stage 17, discrimination of the current vehicle speed delivered via the speedometer inter 13 with the threshold takes place and, as a result, a control signal is output to a switching stage 21.

The switching stage 21, in turn, is linked at the output end to the long-range radar 9 and switches it off or on again in response to relevant input signals. The switching stage 21 is also linked at the output end to a control input of the central processing unit 15 to switch over its processing mode in such a way that the absent signal of the long-range radar in its deactivated state is compensated with a suitable processing algorithm by means of the continuing presence of signals from the short-range radars 11a, 11b.

The switching stage 21 features a control input through which it is linked with a manually operated off-switch 23 of the speed control apparatus 1. By means of the off-switch 23, the driver can deactivate the switching stage 21 and thus also the deactivation functionality of the long-range radar 9.

By means of a display apparatus 25 arranged at the output end of the switching stage 21, the driver is informed about the operating state of the LLR 9 when it is deactivated. Irrespective of the fact that the adapted processing in the central processing unit 15 ensures processing that largely substitutes the sensor function of the long-range radar 9 below the predetermined threshold speed, the driver can therefore adjust his behavior to the unavailability of long-range object detection.

Figure 2:
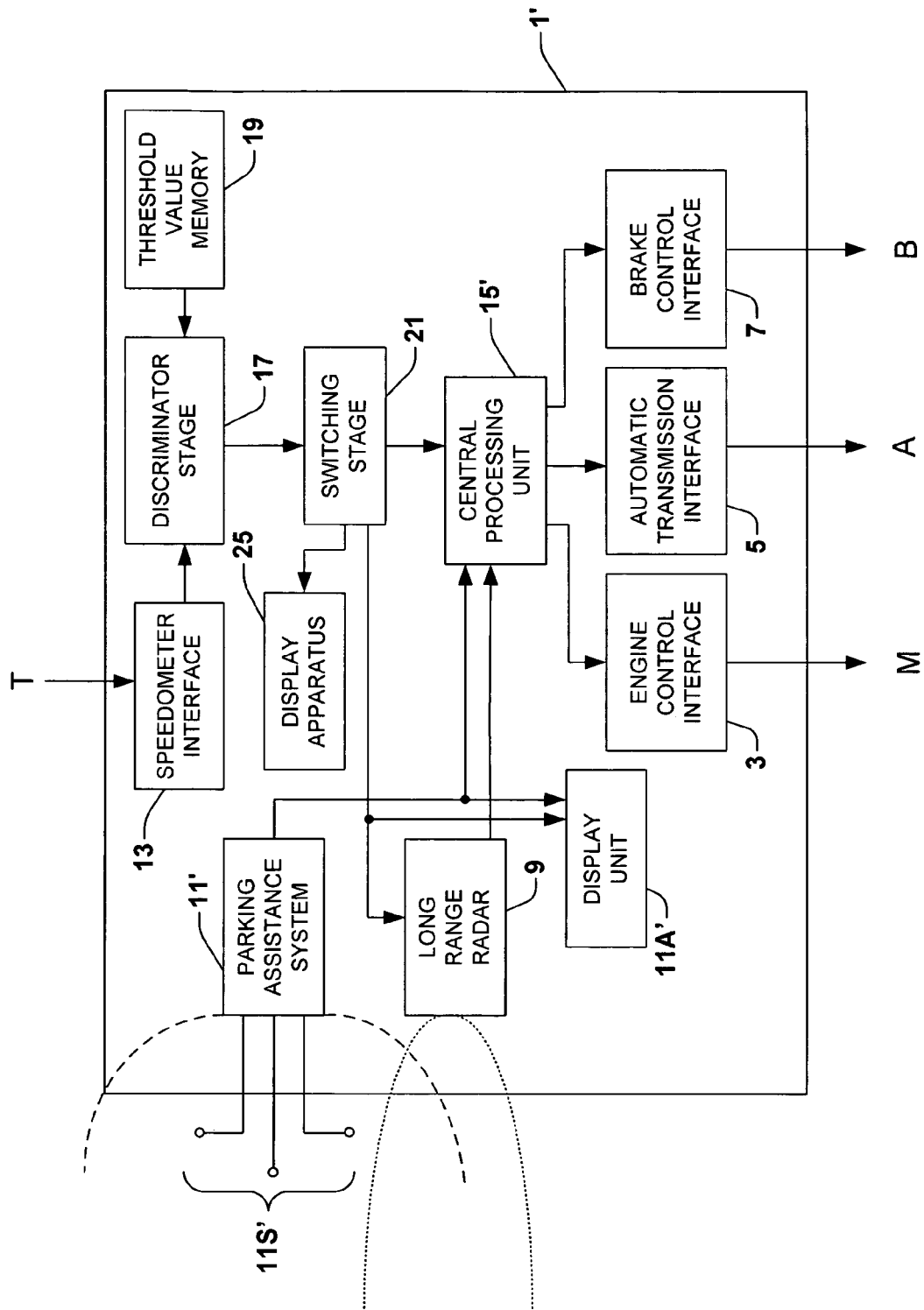
FIG. 2 is a block diagram illustrating a schematic of a second embodiment of the invention.

FIG. 2 shows, as a further embodiment, a modified speed control apparatus 1' that differs from the arrangement 1 in FIG. 1 in particular by the provision of a different short-range detection apparatus. Otherwise, manual deactivation of the LRR deactivation function is not planned in the second embodiment. Insofar as the components of the closed-loop control apparatus 1' agree with those of the closed-loop control apparatus 1, however, they are marked with the same identifying digits and are not explained again here.

As a means of short-range detection of objects in the vehicle's proximity, the speed control apparatus 1' uses a parking assistance system 11', and particularly its sensors 11S' located on the front of the vehicle. The parking assistance system 11' is therefore linked at the input end to a modified central processing unit 15' which processes its signals for adaptive speed control at low speeds. In the example explained here, the front sensors 11S' are IR sensors whose range is greater than needed for the actual parking assistant function so as to ensure that they can be used for the purpose of adaptive speed control.

Here, a display unit 11a' of the parking assistance system 11' has a control input via which it is linked to the switching stage 21 of the speed control apparatus. Via this input, it is deactivated by the switching stage together with the long-range radar 9 as soon as the vehicle's speed falls below the predetermined threshold speed. This prevents typical audio signals of the parking assistant from irritating the driver when the sensors (and, to some extent, also the evaluation electronics) are being used by the central processing unit 15' for adaptive driving speed control.

Although the invention has been illustrated and described with respect to a certain aspect or various aspects, it is obvious that equivalent alterations and modifications will occur to others skilled in the art upon the reading and understanding of this specification and the annexed drawings. In particular regard to the various functions performed by the above described components (e.g., assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising." Also, exemplary is merely intended to mean an example, rather than the best.

The invention claimed is:

1. A driver assistance system of a land or water vehicle, the system comprising:
   a long-range radar apparatus configured to detect distant objects;
   at least one short-range detection apparatus configured to detect objects in the vehicle's close proximity; and
   an operation control apparatus configured to control operation of the long-range radar apparatus as a function of a motion state of the land or water vehicle, wherein the operation control apparatus is further configured to deactivate the long-range radar apparatus when the land or water vehicle is at a standstill, or switch the long-range radar apparatus to a substantially emission-free standby mode, and concurrently keep the short-range detection apparatus activated.

2. The driver assistance system of claim 1, wherein the operation control apparatus is configured to deactivate the long-range radar apparatus when an actual speed of the land or water vehicle falls below a first predetermined threshold speed, or switch the long-range radar apparatus to the standby mode and reactivate it again once the speed exceeds a second predetermined threshold speed.

3. The driver assistance system of claim 2, wherein the first predetermined threshold speed is equal to the second predetermined threshold speed.

4. The driver assistance system of claim 1, wherein the long-range radar apparatus is configured to provide exclusive continuous wave operation.

5. The driver assistance system of claim 1, wherein the long-range radar apparatus is configured to operate with one single predetermined transmitting power value.

6. The driver assistance system of claim 1, wherein the short-range detection apparatus comprises a further radar apparatus that has a substantially lower transmitting power than the long-range radar apparatus.

7. The driver assistance system of claim 1, wherein the operation control apparatus is configured to be selectively deactivated.

8. The driver assistance system of claim 7, further comprising a manual switch configured to deactivate the operation control apparatus.

9. The driver assistance system of claim 1, wherein the long-range radar apparatus is configured to control one or more of an engine, automatic transmission or brake function of the land or water vehicle, or control a warning display apparatus.

10. The driver assistance system of claim 9, further comprising a control changeover unit configured to switch over a control function of the long-range radar apparatus when in its deactivated state or standby mode to the short-range detection apparatus.

11. The driver assistance system of claim 1, further comprising an operating mode display apparatus configured to display a deactivated or standby state of the long-range radar apparatus or a warning function.

12. The driver assistance system of claim 1, wherein the short-range detection apparatus is configured as a parking assistance system, and wherein the operation control apparatus is configured to activate the short-range detection apparatus at a standstill of the land or water vehicle, or when the vehicle is below a first predetermined threshold speed.

13. The driver assistance system of claim 12, wherein the short-range detection apparatus is configured to be selectively modified to increase the detection range thereof when activated by the parking assistance system.

14. The driver assistance system of claim 12, wherein the parking assistance system is adapted to modify at least one display function when the short-range detection apparatus is activated.

15. The driver assistance system of claim 14, wherein the parking assistance system is configured to deactivate the associated display when used as the short-range detection apparatus of the driver assistance system.

16. A driver assistance system of a land or water vehicle, the system comprising:
    a long-range radar apparatus configured to detect distant objects;
    at least one short-range detection apparatus configured to detect objects in the vehicle's close proximity;
    an operation control apparatus configured to control operation of at least the long-range radar apparatus as a function of a motion state of the land or water vehicle, wherein the long-range radar apparatus is configured to provide exclusive continuous wave operation with one single predetermined transmitting power value, and
    wherein the operation control apparatus is configured to deactivate the long-range radar apparatus when the land or water vehicle is at standstill, or switches the long-range radar apparatus to an essentially emission-free standby mode, and concurrently keeps the short-range detection apparatus activated.

17. The driver assistance system of claim 16, wherein the operation control apparatus is configured to deactivate the long-range radar apparatus or switches it to the standby mode when the actual speed of the land or water vehicle falls below a first predetermined threshold speed, and reactivates the long-range apparatus again or switches it back to the normal mode of operation from the standby mode once the speed exceeds a second predetermined threshold speed.

18. The driver assistance system of claim 16, wherein the short-range detection apparatus comprises a further radar apparatus having a substantially lower transmitting power than the long-range radar apparatus.

19. The driver assistance system of claim 16, wherein the short-range detection apparatus is configured as a parking assistance system, and wherein the operation control apparatus is configured to activate the short-range detection apparatus when the land or water vehicle is at standstill or below the first predetermined threshold speed.

20. The driver assistance system of claim 19, wherein the parking assistance system is configured to modify at least one display function of the driver assistance system.

21. A driver assistance system of a land or water vehicle, the system comprising:
    a long-range radar apparatus configured to detect distant objects;
    at least one short-range detection apparatus configured to detect objects in the vehicle's close proximity; and
    an operation control apparatus configured to control operation of at least the long-range radar apparatus as a function of a motion state of the land or water vehicle, the short-range detection apparatus further comprising a further radar apparatus having a substantially lower transmitting power than the long-range radar apparatus, and wherein the operation control apparatus is further configured to deactivate the long-range radar apparatus when the land or water vehicle is at standstill, or switch the long-range radar apparatus to a substantially emission-free standby mode, and keep the short-range detection apparatus activated.

22. The driver assistance system of claim 21, wherein the operation control apparatus is configured to deactivate the long-range radar apparatus when the actual speed of the land or water vehicle falls below a first predetermined threshold speed, or switch the long-range radar apparatus to a standby mode, and reactivates the long-range radar apparatus again once the speed exceeds a second predetermined threshold speed, or switch the long-range radar apparatus back to the normal mode of operation from the standby mode, respectively.

23. The driver assistance system of claim 21, wherein the long-range radar apparatus is configured to provide exclusive continuous wave operation with one single predetermined transmitting power value.

24. The driver assistance system of claim 21, further comprising an operating mode display apparatus configured to display a deactivated or standby state of the long-range radar apparatus.

25. The driver assistance system of claim 21, further comprising a control changeover unit configured to switch over a control function of the long-range radar apparatus in its deactivated state or standby mode solely to the short-range detection apparatus.

26. The driver assistance system of claim 21, wherein the operation control apparatus is configured to be selectively deactivated.

27. The driver assistance system of a land or water vehicle, the system comprising:
    a long-range radar apparatus configured to detect distant objects;
    at least one short-range detection apparatus configured to detect objects in the vehicle's close proximity; and an operation control apparatus configured to control operation of at least the long-range radar apparatus as a function of a motion state of the land or water vehicle, wherein the short range detection apparatus is configured as a parking assistance system, and the operation control apparatus configured to deactivate the long-range radar apparatus and concurrently activate the parking assistance system as an element of the driver assistance system when the land or water vehicle is at standstill.

28. The driver assistance system of claim 27, wherein the operation control apparatus is configured to deactivate the long-range radar apparatus when the actual speed of the land or water vehicle falls below a first predetermined threshold speed, or switches the long-range radar apparatus to the standby mode, and reactivates the long-range radar apparatus again once the speed exceeds a second predetermined threshold speed, or switches the long-range radar apparatus back to the normal mode of operation from the standby mode, respectively.

29. The driver assistance system of claim 27, wherein the long-range radar apparatus is configured to provide exclusive continuous wave operation with one single predetermined transmitting power value.

30. The driver assistance system of claim 27, wherein the operation control apparatus is configured to be selectively deactivated.

31. The driver assistance system of claim 27, further comprising an operating mode display apparatus for display of the deactivated or standby state of the long-range radar apparatus.

32. The driver assistance system of claim 27, further comprising a control changeover unit configured to switch over the control function of the long-range radar apparatus in its deactivated state or standby mode solely to the short-range detection apparatus.

33. The driver assistance system of claim 27, wherein the parking assistance system is configured to modify at least one display function.

* * * * *